Jan. 25, 1938. L. W. KREILICK ET AL 2,106,610
BUFFING SECTION UNIT AND ASSEMBLY
Filed May 3, 1937

Inventor
Lester W. Kreilick
Herbert R. Taylor
By
Attorney

Patented Jan. 25, 1938

2,106,610

UNITED STATES PATENT OFFICE 2,106,610

BUFFING SECTION UNIT AND ASSEMBLY

Lester W. Kreilick and Herbert R. Taylor, Fremont, Ohio, assignors to The Yerges Manufacturing Company, Fremont, Ohio, a corporation of Ohio Application May 3, 1937, Serial No. 140,439

7 Claims. (Cl. 51—193)

This invention relates to assembling fabric plies and disks into buffing sections and wheels.

This invention has utility when embodied in metal disk filler for open-center folded ply fabric disks.

Referring to the drawing.

Figure 1:
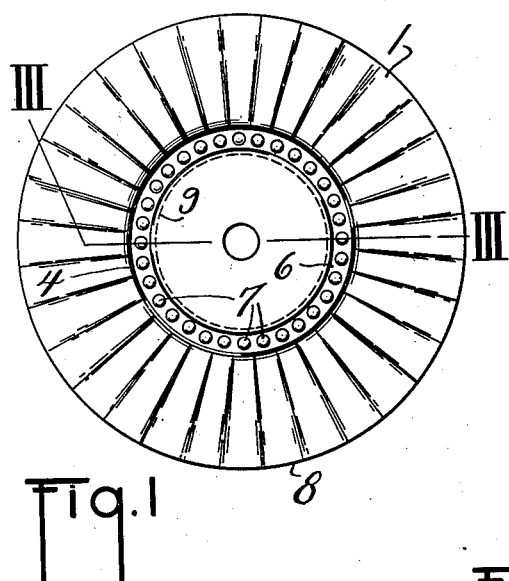
Fig. 1 is a side elevation of a buffing wheel section unit hereunder.
Figure 2:
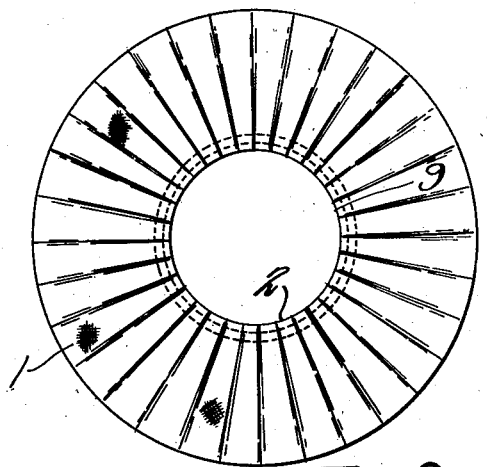
Fig. 2 is a side elevation of a pleated ply fabric disk element for a section of Fig. 1.
Figure 3:
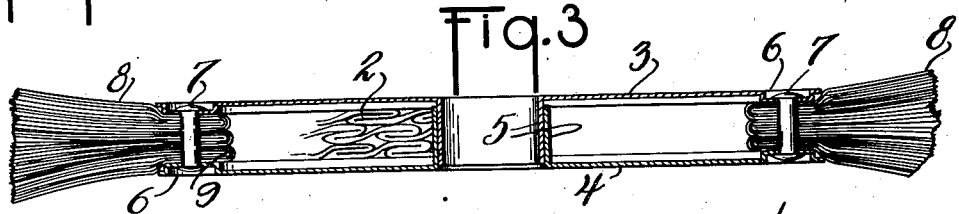
Fig. 3 is a section on the line III—III, Fig. 1.
Figure 5:
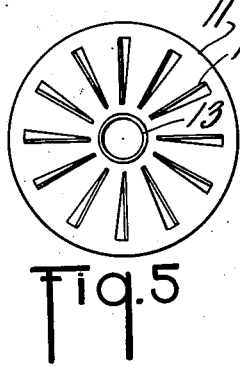
Fig. 5 is a detail view of a spacer or fan device for assembly between buffing section units.
Figure 6:
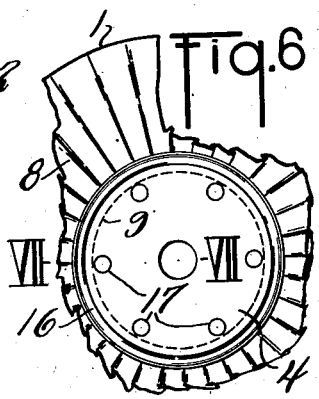
Fig. 6 is a fragmentary view of a ply mounting disk with the assembly rivets less numerous than in Fig. 1.
Figure 4:
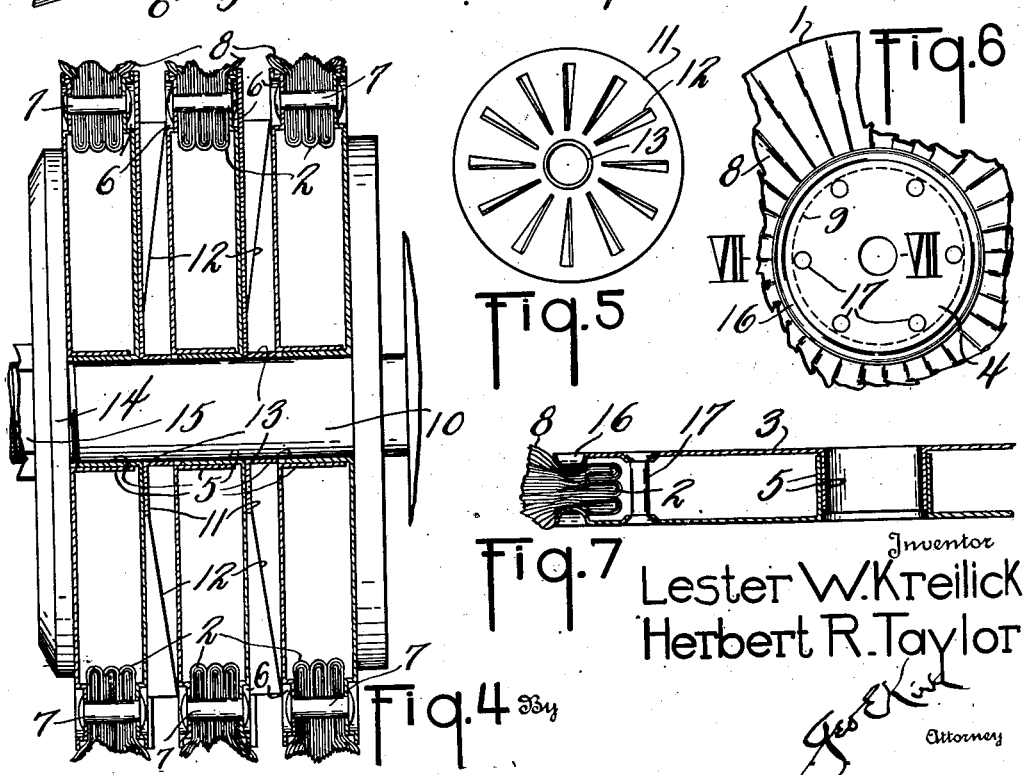
Fig. 4 is a fragmentary view showing a grouping of the sections in assembly on a buffing machine shaft.
Figure 7:
Fig. 7 is a section on the line VII—VII, Fig. 6.

In carrying out the invention herein, canvas duck may be the cotton fabric comprising bias cut pleated disks 1, which may be of three ply assembly and having central pleat 2 spreading outwardly. In the unit herein, there is accordingly shown three of the three ply elements showing eighteen thicknesses of the material. Sheet metal disk 3 is opposed to complementary sheet metal disk 4. Each disk has relatively telescopic hub section 5. Peripherally, the disks have inward offsets 6 shown as opposing or extending toward each other as the hub sections 5.

These opposing complementary disks 3, 4, of sheet metal may be firmly compressed or drawn toward each other, and at the countersunk or offset portion 6 rivets 7 therethrough effect common anchor and such compressing just outward from the fold portions 2 in the pleating that there is fabric spread 8 regularly outward therefrom. This compressing action is efficient in anchoring and holding the fabric against disturbance from speed as centrifugally thrown or in buffing operation as against stock in use. This assembly is rigid and compact as to these sheet metal hub mountings for the plies having open center 9. There is resulting substantial, rigid, light weight, buffing section with the minimum of fabric consumed, but as so assembled available for maximum of wear down in use, with no danger of any particles to be thrown or hazard to result from normal operation. The hub is definitely centralized as to the fabric in the compressing assembly so that sections of units produce no off-center relation, and the one acquiring the disk may readily shim to the proper diameter for machine arbor 10 of the shaft on which to be operated.

In this assembly supplemental disks 11 with radially extending blades 12 may serve as a fan device. This fan device 11, 12, has central hub portion 13 concentric with the hub portions 5. The device, accordingly, promotes ventilation by fans for escape of entrained air or throwing air outward from the wheel against temperature rise in operation. In this assembly there may be compacting of the disk units directly for the section unit 3, 4, to abut succeeding units, or such may be spaced by the fan devices 11, 12, 13. As so assembled on the shaft 10, desired compacting may be effected by causing hub disk 14 to be crowded by nut 15 into the desired compressing relation for the radially extending portions 8 beyond this open center mounting and filler assemblies as herein shown.

Instead of the rivets 7 effecting the anchoring assembly through the fabric disk, the disks 3, 4, may have offset 16 snugly compressing the outermost face of the outer plies in a manner analogous to that of the countersink or offset 6. However, instead of rivets extending through the offset 16, countersunk rivets 17 extending through the disks 3, 4, independently of the plies may effectively anchor them in more simple assembly but with efficient frictional gripping of the stock.

What is claimed and it is desired to secure by Letters Patent is:

1. A pair of buffing wheel sections medially spaced for peripheral venting, and a fan device between the sections.

2. In a buffing wheel having a plurality of fabric buffing disks forming a section comprising circular fabric means, binding disks assembled one on each side of the section for compressing, edge-gripping contact with the faces of the outermost fabric means, said binding disks having flat outer faces, central telescopically-interfitting portions, and anchoring means through the fabric means and binding disks inward from said outer faces to maintain gripping compression of the fabric means into a section unit with the binding disks providing a hub countersunk into the unit, whereby a plurality of such units are adapted to be assembled with the outermost portions of the fabric means abutting and the binding disks spaced with the hubs aligned.

3. In a buffing wheel having a plurality of fabric buffing disk plies forming a section comprising fabric plies, binding disks assembled one on each side of the section having peripheral annular inwardly extending offsets for compressing, edge-gripping contact with the faces of the outermost fabric plies, said binding disks having concentric sleeve portions extending toward each other, and rivet anchoring means through the respective fabric plies and binding disks effecting assembly thereof into a section.

4. In a buffing wheel, a plurality of fabric buffing disks forming a section comprising fabric disks, binding disks assembled one on each side of the section for compressing, edge-gripping contact with the faces of the outermost fabric disks, said binding disks each having a flange extension located centrally thereof and extending toward the other, anchoring means between the binding disks and through the radially inward portion of the respective fabric disks to maintain gripping compression of the fabric disks into a section unit with the binding disks countersunk into the unit to provide a hub therefor, and fan blade-carrying hub-spacing means between the binding disk faces of successive units of the wheel.

5. Sheet metal disks assembled in pairs as a buffing section center, rivet anchoring means binding the pair of disks together, each of said disks having a flat outer side and an offset therefrom toward the other disk, and a plurality of centrally folded, outwardly extending free edge plies of fabric disks, said metal disk offsets gripping the fabric plies radially outwardly from the fold, said metal disks inwardly from the fold having registering sleeve forming portions.

6. A buffing wheel comprising fabric plies having inner folds forming a ring-shaped open center with the fabric extending radially outwardly therefrom in plural disk form to outer free edges, and means for assembling the plies into a plurality of sections of a wheel, said assembling means including approximately flat sheet metal disks provided with flanges extending centrally toward each other to form a telescoped hub, said metal disks radially outward from said hub being offset toward each other to provide seats, and anchoring rivets in said seats extending through the folded fabric ply inner portions and effecting clamping of said fabric in assembly into a section by said offsets and from said rivets.

7. A buffing wheel comprising fabric plies having inner folds and forming a ring-shaped open centered disk having outer free edges, and means for assembling the plies into a plurality of sections of a wheel, said assembly means including approximately flat sheet metal disks provided with flanges extending centrally toward each other to form a telescoped hub, said sheet metal disks being offset radially outward from said hub toward each other to provide seats, anchoring rivets in said seats and through the folded fabric ply inner portions clamping said fabric into an assembled section, said plies flaring axially beyond the clamping assembly, and fan means placed between the metal disks of sections mounted upon a shaft to form the wheel.

LESTER W. KREILICK.
HERBERT R. TAYLOR.